US 7,551,674 B2

United States Patent
Haskell et al.

(10) Patent No.: US 7,551,674 B2
(45) Date of Patent: *Jun. 23, 2009

(54) USING ORDER DIFFERENCE FOR CALCULATING MOTION VECTOR

(75) Inventors: Barin Geoffry Haskell, Mountain View, CA (US); David William Singer, San Francisco, CA (US); Adriana Dumitras, Sunnyvale, CA (US); Atul Puri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/835,739

(22) Filed: Aug. 8, 2007

(65) Prior Publication Data

US 2007/0274394 A1 Nov. 29, 2007

Related U.S. Application Data

(60) Division of application No. 10/792,669, filed on Mar. 2, 2004, now Pat. No. 7,292,636, which is a continuation of application No. 10/291,320, filed on Nov. 8, 2002, now Pat. No. 7,088,776.

(60) Provisional application No. 60/396,363, filed on Jul. 15, 2002.

(51) Int. Cl.
*H04B 1/66* (2006.01)

(52) U.S. Cl. .............................. 375/240.23; 375/240.25; 375/240.16; 375/240.12; 375/240.01; 382/233; 382/238; 382/235

(58) Field of Classification Search ............ 375/240.23, 375/240.16, 240.12, 240.25, 240.01; 382/238, 382/233, 235

See application file for complete search history.

(56) References Cited

U.S. PATENT DOCUMENTS 5,436,664 A 7/1995 Henry (Continued)

FOREIGN PATENT DOCUMENTS

EP 1014729 6/2000

(Continued)

OTHER PUBLICATIONS

Rob Koenen, "Overview of the MPEG-4 standard," in ISO/IEC JTC1/SC29/WG11 N4668, Mar. 2002.

(Continued)

*Primary Examiner*—Shawn An
(74) *Attorney, Agent, or Firm*—Adeli & Tollen LLP

(57) ABSTRACT

A method and apparatus for variable accuracy inter-picture timing specification for digital video encoding is disclosed. Specifically, the present invention discloses a system that allows the relative timing of nearby video pictures to be encoded in a very efficient manner. In one embodiment, the display time difference between a current video picture and a nearby video picture is determined. The display time difference is then encoded into a digital representation of the video picture. In a preferred embodiment, the nearby video picture is the most recently transmitted stored picture. For coding efficiency, the display time difference may be encoded using a variable length coding system or arithmetic coding. In an alternate embodiment, the display time difference is encoded as a power of two to reduce the number of bits transmitted.

20 Claims, 4 Drawing Sheets

U.S. PATENT DOCUMENTS

| | | | |
|---|---|---|---|
| 5,483,286 | A | 1/1996 | Kim |
| 5,737,023 | A | 4/1998 | Linzer |
| 6,040,861 | A | 3/2000 | Boroczky |
| 6,072,834 | A | 6/2000 | Kim et al. |
| 6,088,485 | A | 7/2000 | Kadono |
| 6,108,047 | A | 8/2000 | Chen |
| 6,295,377 | B1 | 9/2001 | Dufaux et al. |
| 6,297,852 | B1 * | 10/2001 | Laksono et al. ............. 348/584 |
| 6,400,768 | B1 | 6/2002 | Nagumo et al. |
| 6,552,749 | B1 | 4/2003 | Jones et al. |
| 6,728,315 | B2 * | 4/2004 | Haskell et al. ......... 375/240.16 |
| 6,859,609 | B1 | 2/2005 | Watkins |
| 7,088,776 | B2 | 8/2006 | Haskell et al. |
| 7,292,636 | B2 | 11/2007 | Haskell et al. |
| 7,339,991 | B2 | 3/2008 | Haskell et al. |
| 2004/0184543 | A1 | 9/2004 | Haskell et al. |
| 2004/0234143 | A1 | 11/2004 | Hagai et al. |
| 2004/0240557 | A1 | 12/2004 | Haskell et al. |
| 2007/0183492 | A1 | 8/2007 | Haskell et al. |
| 2007/0183501 | A1 | 8/2007 | Haskell et al. |
| 2007/0183502 | A1 | 8/2007 | Haskell et al. |
| 2007/0183503 | A1 | 8/2007 | Haskell et al. |
| 2007/0189378 | A1 | 8/2007 | Haskell et al. |
| 2007/0189379 | A1 | 8/2007 | Haskell et al. |
| 2007/0274395 | A1 | 11/2007 | Haskell et al. |
| 2007/0274677 | A1 | 11/2007 | Haskell et al. |
| 2007/0274678 | A1 | 11/2007 | Haskell et al. |
| 2007/0286282 | A1 | 12/2007 | Haskell et al. |

FOREIGN PATENT DOCUMENTS

| | | |
|---|---|---|
| EP | 1111934 | 6/2001 |
| EP | 1532746 | 5/2005 |
| EP | 1976299 | 10/2008 |
| JP | 10174065 | 6/1998 |
| KR | 2001112806 | 12/2001 |
| WO | WO 2004/008654 | 1/2004 |
| WO | WO 2004/054257 | 6/2004 |

OTHER PUBLICATIONS

ITU-T, "Video coding for low bit rate communication," Recommendation H.263, 1996.
ITU-T, "Video coding for low bit rate communication," Recommendation H.263 Version 2, 1998.
Guy Cote, Berna Erol, Michael Gallant, and Faouzi Kossentini, "H.263+: Video coding at low bit rates," IEEE Trans. on Circuits and Systems for Video Technology, vol. 8, No. 7, pp. 849-866, Nov. 1998.
U.S. Appl. No. 11/835,727, filed Aug. 2007, Haskell, et al.
U.S. Appl. No. 11/835,732, filed Aug. 2007, Haskell, et al.
U.S. Appl. No. 11/835,773, filed Aug. 2007, Haskell, et al.
Non-Final Office Action of U.S. Appl. No. 10/291,320, mailing date Oct. 23, 2003, Haskell, et al., Non-Final Rejection of Parent Application which issued as US Patent 7,088,776.
Final Office Action of U.S. Appl. No. 10/291,320, mailing date Jul. 12, 2004, Haskell, et al., Final Rejection of Parent Application which issued as US Patent 7,088,776.
Non-Final Office Action of U.S. Appl. No. 10/291,320, mailing date Aug. 15, 2005, Haskell, et al., Non-Final Rejection of Parent Application which issued as US Patent 7,088,776.
Notice of Allowance of U.S. Appl. No. 10/291,320, mailing date Mar. 6, 2006, Haskell, et al., which issued as US Patent 7,088,776.
Notice of Allowance of U.S. Appl. No. 10/792,669, mailing date Jun. 26, 2007, Haskell, et al.
Notice of Allowance of U.S. Appl. No. 10/313,773, mailing date Dec. 2, 2003, Haskell, et al., which issued as US Patent 6,728,315.
International Serach Report for PCT/US2003/021714, mailing date Nov. 14, 2003, Apple Computer, Inc.
International Preliminary Examination Report for PCT/US2003/021714, mailing date Sep. 2, 2004, Apple Computer, Inc.
Written Opinion for PCT/US2003/021714, mailing date Apr. 21, 2004, Apple Computer, Inc.
International Search Report for PCT/US2003/024953, mailing date Jan. 27, 2004, Apple Computer, Inc.
International Preliminary Examination Report for PCT/US2003/024953, mailing date Mar. 17, 2004, Apple Computer, Inc.
U.S. Appl. No. 11/779,615, filed Jul. 18, 2007, Haskell, et al.
U.S. Appl. No. 11/779,660, filed Jul. 18, 2007, Haskell, et al.
U.S. Appl. No. 11/779,668, filed Jul. 18, 2007, Haskell, et al.
Notice of Allowance of U.S. Appl. No. 10/792,514, mailing date Sep. 25, 2007, Haskell, et al.
Supplemental Notice of Allowability of U.S. Appl. No. 10/792,514, mailing date Nov. 5, 2007, Haskell, et al.
Non-Final Office Action of U.S. Appl. No. 11/621,969, mailing date Dec. 29, 2008, Haskell, et al.
Non-Final Office Action of U.S. Appl. No. 11/621,971, mailing date Jan. 2, 2009, Haskell, et al.
Restriction Requirement of U.S. Appl. No. 11/621,974, mailing date Jan. 12, 2009, Haskell, Barin Geoffry.
Non-Final Office Action of U.S. Appl. No. 11/835,773, mailing date Aug. 8, 2008, Haskell, et al.
ISO/IEC, "Information technology—generic coding of moving pictures and associated audio information: Video," 13818-2, 1995.
ISO/IEC 14496-2, "Information technology—coding of audio-visual objects—Part 2: Visual," 2001.
Multiple authors, "Special issue on the H.264/AVC video coding standard," IEEE Trans. on Circuits and Systems for Video Technology, vol. 13, No. 7, Jul. 2003.
MPEG-4 Video Group, "MPEG-4 video verification model version 18.0," ISO/IEC JTC1/SC29/WG11 N3908, Jan. 2001.
ISO/IEC JTC 1/SC29/WG 11, "Report of the formal verification tests on AVC, document N6231," Dec. 2003.
Chen, P. Zhou, and Y. He, "Fast motion estimation for JVT," ISO/IEC JTC 1/SC29/WG11 and ITU-T SG16 Q.6, document JVT-G016, 2003.
Michael Horowitz, Anthony Joch, and F. Kossentini, "H.264/AVC Baseline Profile Decoder Complexity Analysis," IEEE Trans. on Circuits and Systems for Video Technology, vol. 13, No. 7, pp. 704-716, Jul. 2003.
Kwong-Keung Leung, Nelson H.C. Yung, Paul Y.S. Cheung, "Parallelization methodology for video coding—an implementation on TMS32OC8O," IEEE Trans. on Circuits and Systems for Video Technology, vol. 10, No. 8, pp. 1413-1425, Dec. 2000.
Weigand, Thomas, "Working Draft No. 2, Revision 0 (WD-2)", JVT of ISO/IEC MPEG and ITU-T VCEG, document JVT-B118, Mar. 13, 2002.
Restriction Requirement of U.S. Appl. No. 11/621,971, mailing date Oct. 17, 2008, Haskell, et al.
Supplemental European Search Report for EP03764499.4, mailing date Oct. 31, 2008, Apple Computer, Inc.
Extended European Search Report for EP08005966.0, mailing date Oct. 31, 2008, Apple Computer, Inc.
ISO/IEC, "Information technology—coding of moving pictures and associated audio for digital storage media at up to about 1,5 mbits/s—Part 2: Video," 11172-2:1993, Aug. 2006.
ITU-T Recommendation H.264: "Advanced video coding for generic audiovisual services", May 2003; also ISO/IEC 14496-10, "Information technology—coding of audio-visual objects—Part 10: Advanced video coding", 2003.
ISO/IEC 14496-10, "Information technology—coding of audio-visual objects—Part 10: Advanced video coding," Oct. 2004.

* cited by examiner

USING ORDER DIFFERENCE FOR CALCULATING MOTION VECTOR

CLAIM OF BENEFIT TO PRIOR APPLICATIONS

This Application is a divisional application of U.S. patent application Ser. No. 10/792,669, now U.S. Pat. No. 7,292,636, entitled "USING ORDER VALUE FOR PROCESSiNG A VIDEO PICTURE", filed Mar. 2, 2004. U.S. patent application Ser. No. 10/792,669 is a continuation application of U.S. patent application Ser. No. 10/291,320, now U.S. Pat. No. 7,088,776, entitled "METHOD AND APPARATUS FOR VARIABLE ACCURACY INTER-PICTURE TIMING SPECIFICATION FOR DIGITAL VIDEO ENCODiNG", filed Nov. 8, 2002. U.S. patent application Ser. No. 10/291,320 claims priority to U.S. Provisional Application 60/396,363, filed Jul.15, 2002. All the above applications are incorporated herein by reference.

FIELD OF THE INVENTION

The present invention relates to the field of multimedia compression systems. In particular the present invention discloses methods and systems for specifying variable accuracy inter-picture timing.

BACKGROUND OF THE INVENTION

Digital based electronic media formats are finally on the cusp of largely replacing analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio-layer 3) are now taking market share from the first generation digital audio format of compact discs.

The video media has been slower to move to digital storage and transmission formats than audio. This has been largely due to the massive amounts of digital information required to accurately represent video in digital form. The massive amounts of digital information needed to accurately represent video require very high-capacity digital storage systems and high-bandwidth transmission systems.

However, video is now rapidly moving to digital storage and transmission formats. Faster computer processors, high-density storage systems, and new efficient compression and encoding algorithms have finally made digital video practical at consumer price points. The DVD (Digital Versatile Disc), a digital video system, has been one of the fastest selling consumer electronic products in years. DVDs have been rapidly supplanting Video-Cassette Recorders (VCRs) as the pre-recorded video playback system of choice due to their high video quality, very high audio quality, convenience, and extra features. The antiquated analog NTSC (National Television Standards Committee) video transmission system is currently in the process of being replaced with the digital ATSC (Advanced Television Standards Committee) video transmission system.

Computer systems have been using various different digital video encoding formats for a number of years. Among the best digital video compression and encoding systems used by computer systems have been the digital video systems backed by the Motion Pictures Expert Group commonly known by the acronym MPEG. The three most well known and highly used digital video formats from MPEG are known simply as MPEG-1, MPEG-2, and MPEG-4. VideoCDs (VCDs) and early consumer-grade digital video editing systems use the early MPEG-1 digital video encoding format. Digital Versatile Discs (DVDs) and the Dish Network brand Direct Broadcast Satellite (DBS) television broadcast system use the higher quality MPEG-2 digital video compression and encoding system. The MPEG-4 encoding system is rapidly being adapted by the latest computer based digital video encoders and associated digital video players.

The MPEG-2 and MPEG-4 standards compress a series of video frames or video fields and then encode the compressed frames or fields into a digital bitstream. When encoding a video frame or field with the MPEG-2 and MPEG-4 systems, the video frame or field is divided into a rectangular grid of macroblocks. Each macroblock is independently compressed and encoded.

When compressing a video frame or field, the MPEG-4 standard may compress the frame or field into one of three types of compressed frames or fields: Intra-frames (I-frames), Unidirectional Predicted frames (P-frames), or Bi-Directional Predicted frames (B-frames). Intra-frames completely independently encode an independent video frame with no reference to other video frames. P-frames define a video frame with reference to a single previously displayed video frame. B-frames define a video frame with reference to both a video frame displayed before the current frame and a video frame to be displayed after the current frame. Due to their efficient usage of redundant video information, P-frames and B-frames generally provide the best compression.

SUMMARY OF THE INVENTION

A method and apparatus for variable accuracy inter-picture timing specification for digital video encoding is disclosed. Specifically, the present invention discloses a system that allows the relative timing of nearby video pictures to be encoded in a very efficient manner. In one embodiment, the display time difference between a current video picture and a nearby video picture is determined. The display time difference is then encoded into a digital representation of the video picture. In a preferred embodiment, the nearby video picture is the most recently transmitted stored picture.

For coding efficiency, the display time difference may be encoded using a variable length coding system or arithmetic coding. In an alternate embodiment, the display time difference is encoded as a power of two to reduce the number of bits transmitted.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and system for specifying Variable Accuracy Inter-Picture Timing in a multimedia compression and encoding system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 multimedia compression and encoding system. However, the same techniques can easily be applied to other types of compression and encoding systems.

Multimedia Compression and Encoding Overview

Figure 1:
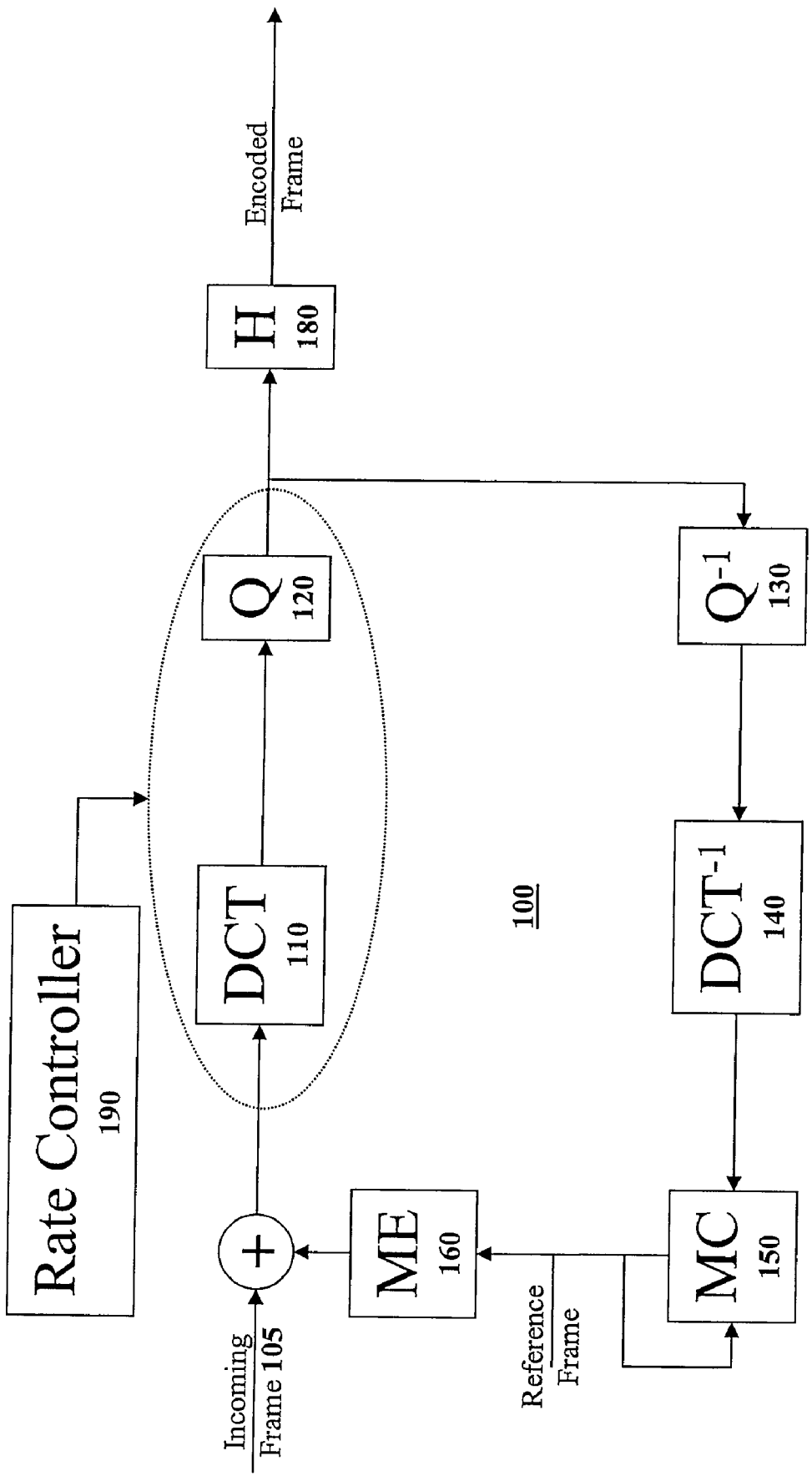
FIG. 1 illustrates a high-level block diagram of one possible a digital video encoder system.

FIG. 1 illustrates a high-level block diagram of a typical digital video encoder 100 as is well known in the art. The digital video encoder 100 receives an incoming video stream of video frames 105 at the left of the block diagram. Each video frame is processed by a Discrete Cosine Transformation (DCT) unit 110. The frame may be processed independently (an intra-frame) or with reference to information from other frames received from the motion compensation unit (an inter-frame). Next, a Quantizer (Q) unit 120 quantizes the information from the Discrete Cosine Transformation unit 110. Finally, the quantized video frame is then encoded with an entropy encoder (H) unit 180 to produce an encoded bitstream. The entropy encoder (H) unit 180 may use a variable length coding (VLC) system.

Since an inter-frame encoded video frame is defined with reference to other nearby video frames, the digital video encoder 100 needs to create a copy of how decoded each frame will appear within a digital video decoder such that inter-frames may be encoded. Thus, the lower portion of the digital video encoder 100 is actually a digital video decoder system. Specifically, an inverse quantizer ($Q^{-1}$) unit 130 reverses the quantization of the video frame information and an inverse Discrete Cosine Transformation ($DCT^{-1}$) unit 140 reverses the Discrete Cosine Transformation of the video frame information. After all the DCT coefficients are reconstructed from iDCT, the motion compensation unit will use the information, along with the motion vectors, to reconstruct the encoded frame which is then used as the reference frame for the motion estimation of the next frame.

The decoded video frame may then be used to encode inter-frames (P-frames or B-frames) that are defined relative to information in the decoded video frame. Specifically, a motion compensation (MC) unit 150 and a motion estimation (ME) unit 160 are used to determine motion vectors and generate differential values used to encode inter-frames.

A rate controller 190 receives information from many different components in a digital video encoder 100 and uses the information to allocate a bit budget for each video frame. The rate controller 190 should allocate the bit budget in a manner that will generate the highest quality digital video bit stream that that complies with a specified set of restrictions. Specifically, the rate controller 190 attempts to generate the highest quality compressed video stream without overflowing buffers (exceeding the amount of available memory in a decoder by sending more information than can be stored) or underflowing buffers (not sending video frames fast enough such that a decoder runs out of video frames to display).

Multimedia Compression and Encoding Overview

In some video signals the time between successive video pictures (frames or fields) may not be constant. (Note: This document will use the term video pictures to generically refer to video frames or video fields.) For example, some video pictures may be dropped because of transmission bandwidth constraints. Furthermore, the video timing may also vary due to camera irregularity or special effects such as slow motion or fast motion. In some video streams, the original video source may simply have non-uniform inter-picture times by design. For example, synthesized video such as computer graphic animations may have non-uniform timing since no arbitrary video timing is created by a uniform video capture system such as a video camera system. A flexible digital video encoding system should be able to handle non-uniform timing.

Many digital video encoding systems divide video pictures into a rectangular grid of macroblocks. Each individual macroblock from the video picture is independently compressed and encoded. In some embodiments, sub-blocks of macroblocks known as 'pixelblocks' are used. Such pixel blocks may have their own motion vectors that may be interpolated. This document will refer to macroblocks although the teachings of the present invention may be applied equally to both macroblocks and pixelblocks.

Some video coding standards, e.g., ISO MPEG standards or the ITU H.264 standard, use different types of predicted macroblocks to encode video pictures. In one scenario, a macroblock may be one of three types:
1. I-macroblock—An Intra (I) macroblock uses no information from any other video pictures in its coding (it is completely self-defined);
2. P-macroblock—A unidirectionally predicted (P) macroblock refers to picture information from one preceding video picture; or
3. B-macroblock—A bi-directional predicted (B) macroblock uses information from one preceding picture and one future video picture.

If all the macroblocks in a video picture are Intra-macroblocks, then the video picture is an Intra-frame. If a video picture only includes unidirectional predicted macro blocks or intra-macroblocks, then the video picture is known as a P-frame. If the video picture contains any bi-directional predicted macroblocks, then the video picture is known as a B-frame. For the simplicity, this document will consider the case where all macroblocks within a given picture are of the same type.

An example sequence of video pictures to be encoded might be represented as $I_1 B_2 B_3 B_4 P_5 B_6 B_7 B_8 B_9 P_{10} B_{11} P_{12} B_{13} I_{14} \ldots$ where the letter (I, P, or B) represents if the video picture is an I-frame, P-frame, or B-frame and the number represents the camera order of the video picture in the sequence of video pictures. The camera order is the order in which a camera recorded the video pictures and thus is also the order in which the video pictures should be displayed (the display order).

Figure 2:
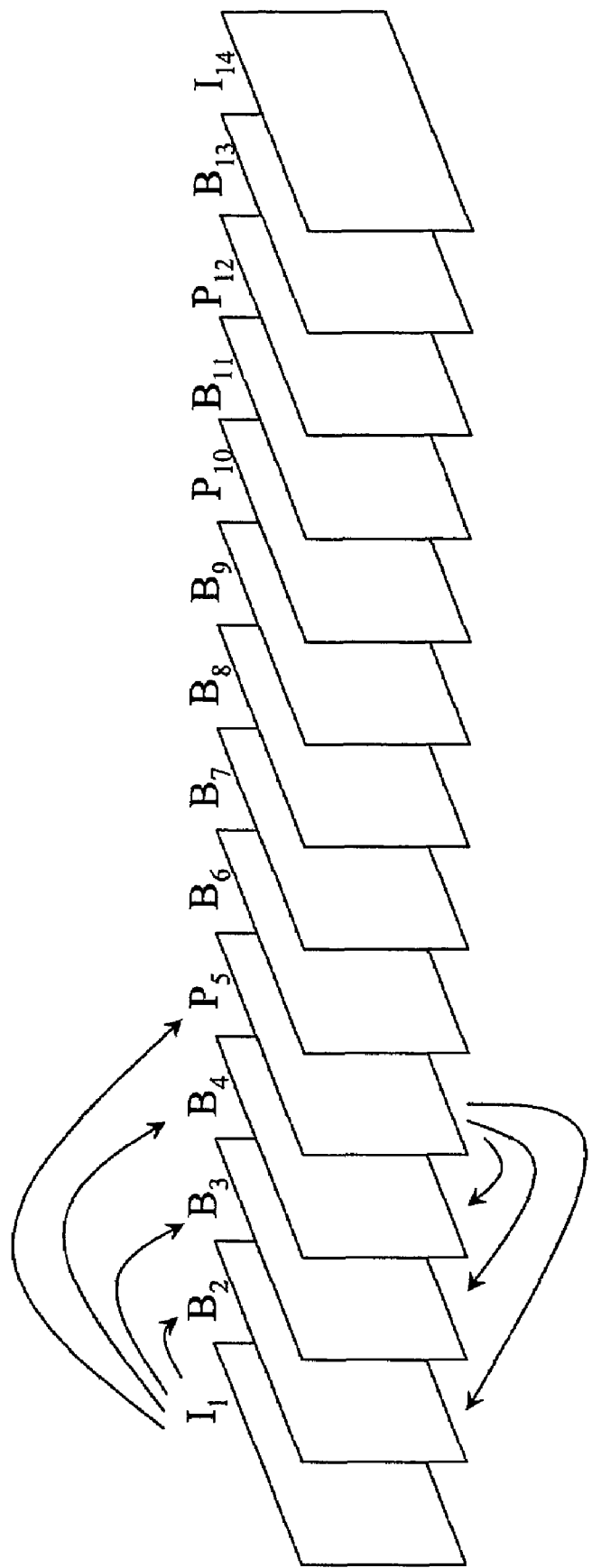
FIG. 2 illustrates a serious of video pictures in the order that the pictures should be displayed wherein the arrows connecting different pictures indicate inter-picture dependency created using motion compensation.

The previous example series of video pictures is graphically illustrated in FIG. 2. Referring to FIG. 2, the arrows indicate that macroblocks from a stored picture (I-frame or P-frame in this case) are used in the motion compensated prediction of other pictures.

In the scenario of FIG. 2, no information from other pictures is used in the encoding of the intra-frame video picture $I_1$. Video picture $P_5$ is a P-frame that uses video information from previous video picture $I_1$ in its coding such that an arrow is drawn from video picture $I_1$ to video picture $P_5$. Video picture $B_2$, video picture $B_3$, video picture $B_4$ all use information from both video picture $I_1$ and video picture $P_5$ in their coding such that arrows are drawn from video picture $I_1$ and video picture $P_5$ to video picture $B_2$, video picture $B_3$, and video picture $B_4$. As stated above the inter-picture times are, in general, not the same.

Since B-pictures use information from future pictures (pictures that will be displayed later), the transmission order is usually different than the display order. Specifically, video pictures that are needed to construct other video pictures should be transmitted first. For the above sequence, the transmission order might be $I_1 P_5 B_2 B_3 B_4 P_{10} B_6 B_7 B_8 B_9 P_{12} B_{11} I_{14} B_{13} \ldots$ FIG. 3 graphically illustrates the above transmission order of the video pictures from FIG. 2. Again, the arrows in the figure indicate that macroblocks from a stored video picture (I or P in this case) are used in the motion compensated prediction of other video pictures.

Figure 3:
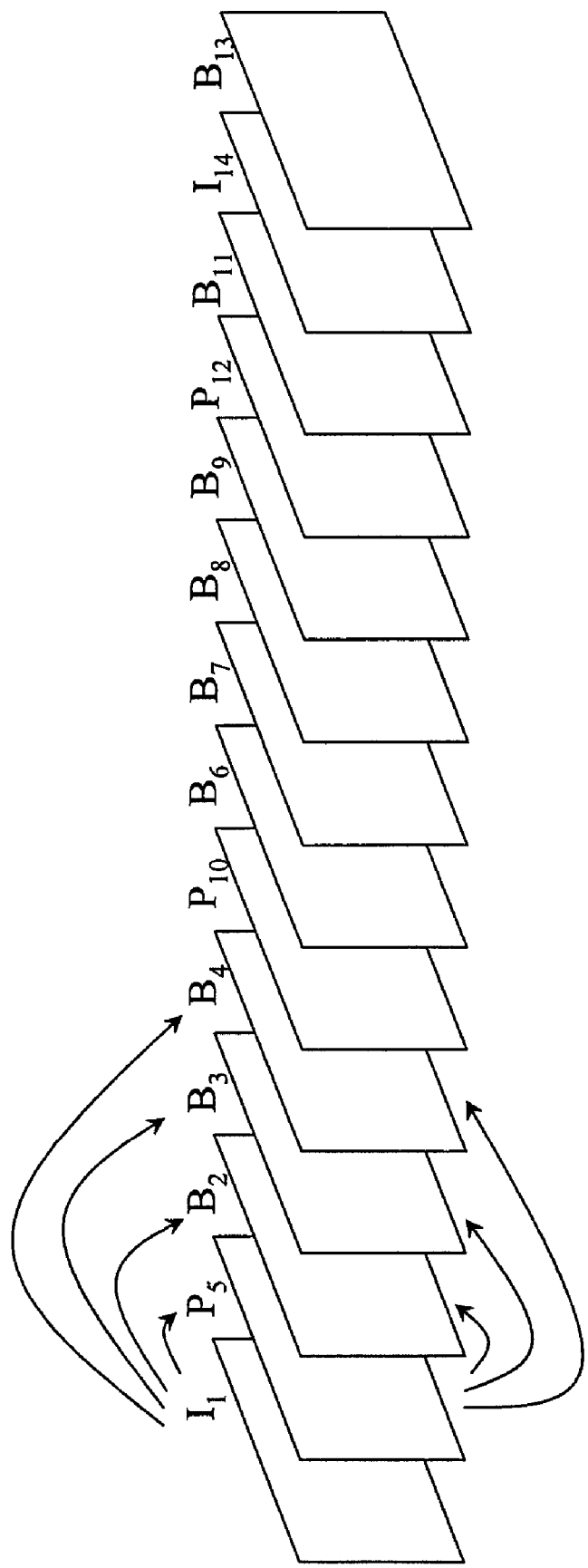
FIG. 3 illustrates the video pictures from FIG. 2 listed in a preferred transmission order of pictures wherein the arrows connecting different pictures indicate inter-picture dependency created using motion compensation.

Referring to FIG. 3, the system first transmits I-frame $I_1$ which does not depend on any other frame. Next, the system transmits P-frame video picture $P_5$ that depends upon video picture $I_1$. Next, the system transmits B-frame video picture $B_2$ after video picture $P_5$ even though video picture $B_2$ will be displayed before video picture $P_5$. The reason for this is that when it comes time to decode $B_2$, the decoder will have already received and stored the information in video pictures $I_1$ and $P_5$ necessary to decode video picture $B_2$. Similarly, video pictures $I_1$ and $P_5$ are ready to be used to decode subsequent video picture $B_3$ and video picture $B_4$. The receiver/decoder reorders the video picture sequence for proper display. In this operation I and P pictures are often referred to as stored pictures.

The coding of the P-frame pictures typically utilizes Motion Compensation, wherein a Motion Vector is computed for each macroblock in the picture. Using the computed motion vector, a prediction macroblock (P-macroblock) can be formed by translation of pixels in the aforementioned previous picture. The difference between the actual macroblock in the P-frame picture and the prediction macroblock is then coded for transmission.

Each motion vector may also be transmitted via predictive coding. For example, a motion vector prediction may be formed using nearby motion vectors. In such a case, then the difference between the actual motion vector and the motion vector prediction is coded for transmission.

Each B-macroblock uses two motion vectors: a first motion vector referencing the aforementioned previous video picture and a second motion vector referencing the future video picture. From these two motion vectors, two prediction macroblocks are computed. The two predicted macroblocks are then combined together, using some function, to form a final predicted macroblock. As above, the difference between the actual macroblock in the B-frame picture and the final predicted macroblock is then encoded for transmission.

As with P-macroblocks, each motion vector (MV) of a B-macroblock may be transmitted via predictive coding. Specifically, a predicted motion vector is formed using nearby motion vectors. Then, the difference between the actual motion vector and the predicted is coded for transmission.

However, with B-macroblocks the opportunity exists for interpolating motion vectors from motion vectors in the nearest stored picture macroblock. Such interpolation is carried out both in the digital video encoder and the digital video decoder.

This motion vector interpolation works particularly well on video pictures from a video sequence where a camera is slowly panning across a stationary background. In fact, such motion vector interpolation may be good enough to be used alone. Specifically, this means that no differential information needs be calculated or transmitted for these B-macroblock motion vectors encoded using interpolation.

To illustrate further, in the above scenario let us represent the inter-picture display time between pictures i and j as $D_{i,j}$, i.e., if the display times of the pictures are $T_i$ and $T_j$, respectively, then $D_{i,j}=T_i-T_j$ from which it follows that $D_{i,k}=D_{i,j}+D_{j,k}$ $D_{i,k}=-D_{k,i}$ Note that $D_{i,j}$ may be negative in some cases.

Thus, if $MV_{5,1}$ is a motion vector for a $P_5$ macroblock as referenced to $I_1$, then for the corresponding macroblocks in $B_2$, $B_3$ and $B_4$ the motion vectors as referenced to $I_1$ and $P_5$, respectively, would be interpolated by $MV_{2,1}=MV_{5,1}*D_{2,1}/D_{5,1}$ $MV_{5,2}=MV_{5,1}*D_{5,2}/D_{5,1}$ $MV_{3,1}=MV_{5,1}*D_{3,1}/D_{5,1}$ $MV_{5,3}=MV_{5,3}*D_{5,3}/D_{5,1}$ $MV_{4,1}=MV_{5,1}*D_{4,1}/D_{5,1}$ $MV_{5,4}=MV_{5,1}*D_{5,4}/D_{5,1}$ Note that since ratios of display times are used for motion vector prediction, absolute display times are not needed. Thus, relative display times may be used for $D_{ij}$ display time values.

This scenario may be generalized, as for example in the H.264 standard. In the generalization, a P or B picture may use any previously transmitted picture for its motion vector prediction. Thus, in the above case picture $B_3$ may use picture $I_1$ and picture $B_2$ in its prediction. Moreover, motion vectors may be extrapolated, not just interpolated. Thus, in this case we would have:

$MV_{3,1}=MV_{2,1}*D_{3,1}/D_{2,1}$

Such motion vector extrapolation (or interpolation) may also be used in the prediction process for predictive coding of motion vectors.

In any event, the problem in the case of non-uniform inter-picture times is to transmit the relative display time values of $D_{ij}$ to the receiver, and that is the subject of the present invention. In one embodiment of the present invention, for each picture after the first picture we transmit the display time difference between the current picture and the most recently transmitted stored picture. For error resilience, the transmission could be repeated several times within the picture, e.g., in the so-called slice headers of the MPEG or H.264 standards. If all slice headers are lost, then presumably other pictures that rely on the lost picture for decoding information cannot be decoded either.

Thus, in the above scenario we would transmit the following:

$$D_{5,1}\ D_{2,5}\ D_{3,5}\ D_{4,5}\ D_{10,5}\ D_{6,10}\ D_{7,10}\ D_{8,10}\ D_{9,10}\ D_{12,10}$$
$$D_{11,12}\ D_{13,14}\ldots$$

For the purpose of motion vector estimation, the accuracy requirements for $D_{ij}$ may vary from picture to picture. For example, if there is only a single B-frame picture $B_6$ halfway between two P-frame pictures $P_5$ and $P_7$, then it suffices to send only:

$$D_{7,5}=2 \text{ and } D_{6,7}=-1$$

Where the $D_{ij}$ display time values are relative time values. If, instead, video picture $B_6$ is only one quarter the distance between video picture $P_5$ and video picture $P_7$ then the appropriate $D_{ij}$ display time values to send would be:

$$D_{7,5}=4 \text{ and } D_{6,7}=-1$$

Note that in both of the two preceding examples, the display time between the video picture $B_6$ and video picture video picture $P_7$ is being used as the display time "unit" and the display time difference between video picture $P_5$ and picture video picture $P_7$ is four display time "units".

In general, motion vector estimation is less complex if divisors are powers of two. This is easily achieved in our embodiment if $D_{ij}$ (the inter-picture time) between two stored pictures is chosen to be a power of two as graphically illustrated in FIG. 4. Alternatively, the estimation procedure could be defined to truncate or round all divisors to a power of two.

Figure 4:
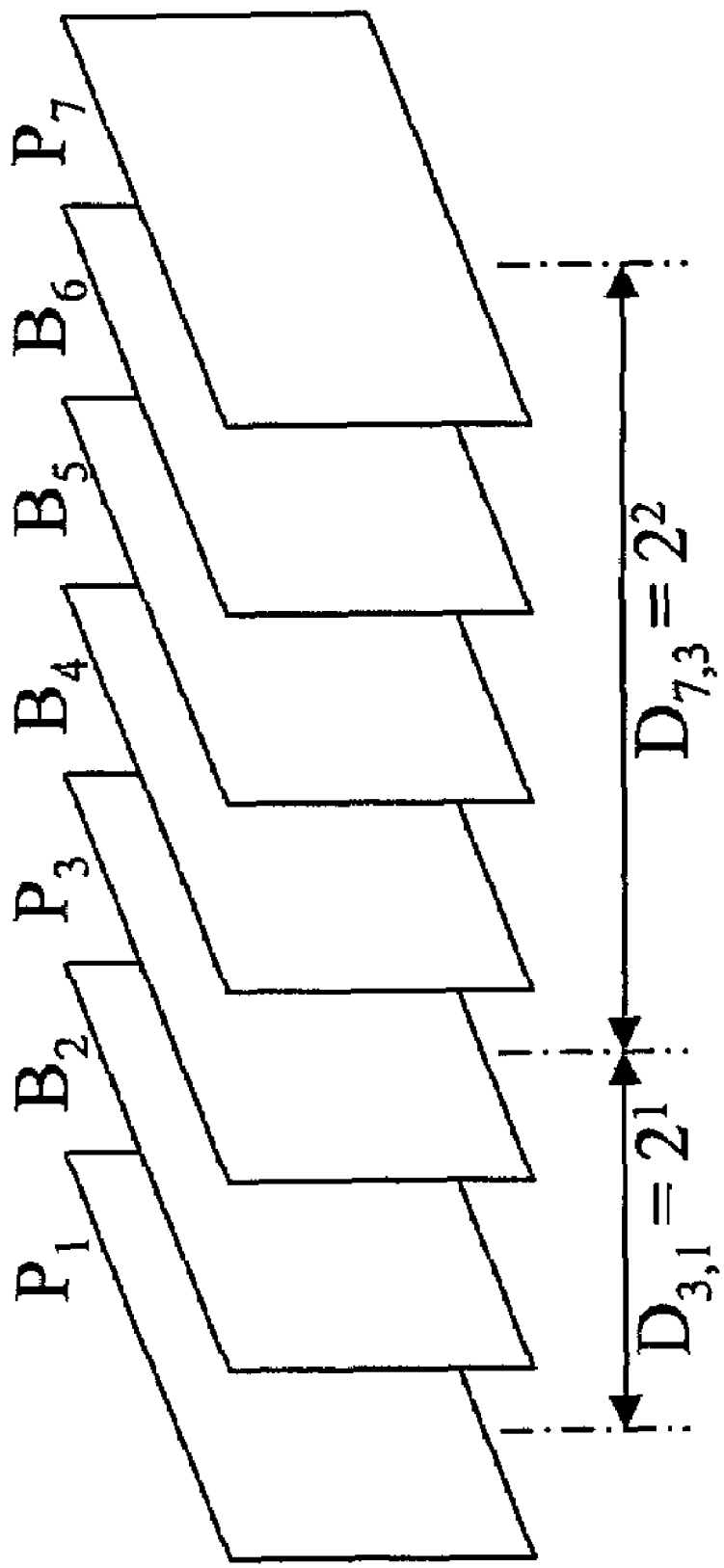
FIG. 4 graphically illustrates a series of video pictures wherein the distances between video pictures that reference each other are chosen to be powers of two.

In the case where an inter-picture time is to be a power of two, the number of data bits can be reduced if only the integer power (of two) is transmitted instead of the full value of the inter-picture time. FIG. 4 graphically illustrates a case wherein the distances between pictures are chosen to be powers of two. In such a case, the $D_{3,1}$ display time value of 2 between video picture $P_1$ and picture video picture $P_3$ is transmitted as 1 (since $2^1=2$) and the $D_{7,3}$ display time value of 4 between video picture $P_7$ and picture video picture $P_3$ can be transmitted as 2 (since $2^2=4$).

In some cases, motion vector interpolation may not be used. However, it is still necessary to transmit the display order of the video pictures to the receiver/player system such that the receiver/player system will display the video pictures in the proper order. In this case, simple signed integer values for $D_{ij}$ suffice irrespective of the actual display times. In some applications only the sign may be needed.

The inter-picture times $D_{ij}$ may simply be transmitted as simple signed integer values. However, many methods may be used for encoding the $D_{ij}$ values to achieve additional compression. For example, a sign bit followed by a variable length coded magnitude is relatively easy to implement and provides coding efficiency.

One such variable length coding system that may be used is known as UVLC (Universal Variable Length Code). The UVLC variable length coding system is given by the code words:

```
1 =             1
2 =           0 1 0
3 =           0 1 1
4 =         0 0 1 0 0
5 =         0 0 1 0 1
```

```
6 =         0 0 1 1 0
7 =         0 0 1 1 1
8 =       0 0 0 1 0 0 0 . . .
```

Another method of encoding the inter-picture times may be to use arithmetic coding. Typically, arithmetic coding utilizes conditional probabilities to effect a very high compression of the data bits.

Thus, the present invention introduces a simple but powerful method of encoding and transmitting inter-picture display times. The encoding of inter-picture display times can be made very efficient by using variable length coding or arithmetic coding. Furthermore, a desired accuracy can be chosen to meet the needs of the video decoder, but no more.

The foregoing has described a system for specifying variable accuracy inter-picture timing in a multimedia compression and encoding system. It is contemplated that changes and modifications may be made by one of ordinary skill in the art, to the materials and arrangements of elements of the present invention without departing from the scope of the invention.

We claim:

1. For a stream comprising a first video picture, a second video picture, and a third video picture, a method of decoding video with a video decoder, the method comprising:
at the video decoder:
computing a first order difference between an order value for the second video picture and an order value for the first video picture;
computing a second order difference between an order value for the third video picture and said order value for said first video picture;
calculating a particular motion vector for said second video picture by multiplying a motion vector for the third video picture with a particular value that is based on said first order difference and said second order difference; and
with the video decoder, decoding at least one video picture by using the computed motion vectors.

2. The method of claim 1, wherein calculating the particular motion vector for said second video picture comprises using an interpolation operation on the motion vector for the third video picture to calculate the particular motion vector.

3. The method of claim 1, wherein said first video picture is for decoding before a decoding of said second video picture.

4. The method of claim 1, wherein said order value for said second video picture is derived from a value that is stored in a slice header that is associated with said second video picture.

5. The method of claim 1, wherein said order value for the second video picture is derived from a value that is stored more than once in said second video picture.

6. The method of claim 1, wherein said order value for said second video picture comprises a relative picture count value.

7. The method of claim 1, wherein an order value for a particular video picture is representative of a positional relationship of the particular video picture with respect to another video picture.

8. The method of claim 1, wherein an order value for a particular video picture is for specifying a position for the particular video picture in a sequence of video pictures.

9. The method of claim 1, wherein a particular order value for a particular video picture specifies a display order for the particular video picture in a sequence of video pictures.

10. The method of claim 1, wherein said order value for said second video picture comprises a time value.

11. A decoder comprising:
a storage for storing a first video picture, a second video picture, and a third video picture; and
at least one processor for:
computing a first order difference between an order value for the second video picture and an order value for the first video picture;
computing a second order difference between an order value for the third video picture and said order value for said first video picture;
calculating a particular motion vector for said second video picture by multiplying a motion vector for the third video picture with a particular value that is based on said first order difference and said second order difference; and
decoding at least one video picture by using the calculated motion vector.

12. The decoder of claim 11, wherein calculating the particular motion vector for said second video picture comprises for using an interpolation operation on the motion vector for the third video picture to calculate the particular motion vector.

13. The decoder of claim 11, wherein said first video picture is for decoding before a decoding of said second video picture.

14. The decoder of claim 11, wherein said order value for said second video picture is derived from a value that is stored in a slice header that is associated with said second video picture.

15. The decoder of claim 11, wherein said order value for the second video picture is derived from a value that is stored more than once in said second video picture.

16. The decoder of claim 11, wherein said order value for said second video picture comprises a relative picture count value.

17. The decoder claim 11, wherein an order value for a particular video picture is representative of a positional relationship of the particular video picture with respect to another video picture.

18. The decoder claim 11, wherein an order value for a particular video picture is for specifying a position for the particular video picture in a sequence of video pictures.

19. The decoder of claim 11, wherein a particular order value for a particular video picture specifies a display order for the particular video picture in a sequence of video pictures.

20. The decoder of claim 11, wherein said order value for said second video picture comprises a time value.

* * * * *